United States Patent [19]

Stecura et al.

[11] 4,055,705

[45] Oct. 25, 1977

[54] THERMAL BARRIER COATING SYSTEM

[75] Inventors: Stephan Stecura, Parma; Curt H. Leibert, Middleburg Heights, both of Ohio

[73] Assignee: The United States of America as represented by the Administrator of the National Aeronautics and Space Administration, Washington, D.C.

[21] Appl. No.: 686,449

[22] Filed: May 14, 1976

[51] Int. Cl.$^2$ .............................................. B32B 15/04
[52] U.S. Cl. ..................................... 428/633; 428/652; 428/667; 427/405; 427/419 A; 427/34; 427/423
[58] Field of Search ..................... 29/197, 197.5, 183.5, 29/194; 427/34, 214; 428/632, 633, 652, 667, 672

[56] References Cited

U.S. PATENT DOCUMENTS

| | | | |
|---|---|---|---|
| 3,410,716 | 11/1968 | Hilty | 427/34 |
| 3,719,519 | 3/1973 | Perugini | 427/34 |
| 3,879,831 | 4/1975 | Rigney et al. | 29/197 |
| 3,957,454 | 5/1976 | Bessen | 29/197 |

*Primary Examiner*—Ralph S. Kendall
*Attorney, Agent, or Firm*—N. T. Musial; G. E. Shook; J. R. Manning

[57] ABSTRACT

A coating system which contains a bond coating and a thermal barrier coating is applied to metal surfaces such as turbine blades and which provides both low thermal conductivity and improved adherence when exposed to high temperature gases or liquids. The bond coating contains NiCrAlY and the thermal barrier coating contains a reflective oxide. The reflective oxides $ZrO_2$—$Y_2O_3$ and $ZrO_2$—MgO have demonstrated significant utility in high temperature turbine applications.

8 Claims, No Drawings

THERMAL BARRIER COATING SYSTEM

ORIGIN OF THE INVENTION

The invention described herein was made by employees of the United States government and may be manufactured and used by and for the government for governmental purposes without the payment of any royalties thereon or therefore.

FIELD OF THE INVENTION

The invention relates to a thermal barrier coating system for metal surfaces that are subject to high temperature uses, such as the surfaces of turbine blades, vanes and the like.

BACKGROUND OF THE INVENTION

The operating temperatures of the combustion gases utilized in the turbines of jet aircraft such as the 747 and DC10 reach approximately 2,000° F or more thus can produce melting of most commercially available metals. Because of this, engine designers have developed new alloys for use in fabricating turbine blades. Further, in order to permit the blades to effectively perform in the high temperature atmosphere, the blades are typically coated with intermetallic aluminide or metal-based overlay coatings. One ceramic based coating that was examined in the past is a Ni-20 chromium bond coating with a $ZrO_2$-CaO barrier coating. The coating has only modest adherence and frequent;y suffers from partial or fatal barrier spallation or thermal shock cracking after relatively short periods of exposure to high temperature combustion gases. Further, the calcia stablized zirconia is gradually graded so that the surface layer is 100% stabilized zirconia. This causes quality control and adherence problems. Moreover, the method of application required to produce the graded layer is tedious, Coatings utilizing NiCrAlY and other complex aluminized coatings have been proposed (see, for example, U.S. Pat. Nos. 3,869,779; 3,846,159; and 3,676,085). Further, U.S. Pat. No. 3,410,716 (Hiltz) discloses that zirconium dioxide can form a component of an oxide composition that bonds well to tungsten substrates. The Hiltz patent also discloses that magnesium oxide and yttrium oxide in small amounts may be utilized for stabilization purposes.

SUMMARY OF THE INVENTION

In accordance with the invention, a coating system is provided which overcomes the disadvantages of the barrier coatings discussed above. The thermal barrier coating system of the invention comprises a bond coating containing NiCrAlY and a thermal barrier coating containing a ceramic reflective oxide. Suitable ceramic reflective oxides are those which are highly reflective in the 1-2$\mu$ infrared band. Preferred reflective oxides are $ZrO_2$-$Y_2O_3$ and $ZrO_2$-MgO.

The present invention also concerns a method of coating metal surfaces which comprises coating first with a bond coating containing NiCrAlY and subsequently coating the bond coated surfaces with a thermal barrier coating containing a ceramic reflective oxide. The method of the invention has particular utility as applied to surfaces of components, such as blades or vanes, of turbines which are subjected to high temperature gases and liquids.

An important feature of the invention is that the coating system demonstrates strong adherence to metal surfaces and, in particular, has been shown to form an especially strong bond to nickel. Further, the coating system of the invention is not sensitive to thermal shock cracking or barrier spallation. Moreover, the coating system can be polished to reduce aerodynamic frictional losses.

Other features and advantages of the present invention will be set forth in, or apparent from, the detailed description of the preferred embodiment found herein below.

DESCRIPTION OF THE PREFERRED EMBODIMENTS

As previously described, the inventive coating system comprises a bond coating containing NiCrAlY to which a ceramic reflective oxide is applied. The reflective ceramic oxide is highly reflective and preferably contains $ZrO_2$-$Y_2O_3$. The oxide may also be $ZrO_2$-MgO.

The ceramic coatings have a low thermal conductivity and thereby impose a thermal barrier between the high temperature combustion gases and air-cooled metal parts, such as the combustor or turbine blades and vanes of aircraft engines, power generating turbines or other air/liquid cooled components. The use of low thermal conduction ceramic coatings to provide a thermal barrier improves the efficiency of such gas turbine engines. Specifically, substantially higher operating temperatures can be utilized with no significant additional losses due to the increased cooling while still maintaining the engine components at or below the temperatures that they are presently subjected to. this permits the use of such higher operating temperatures without requiring the use of the newer and more expensive turnbine alloys. Thus, low alloy content metals may be substituted for alloys presently utilized in high temperature power system components at significant monetary savings.

As noted above, the coating system of the present invention comprises two layers which are able to withstand both the thermal and centrifugal stresses to which gas turbine engine blades are subjected. The bond coat which comprises NiCrAlY is advantageously applied to the substrate by plasma spraying, although cladding, slurry spray and sintering are examples of other suitable techniques that could be used for this purpose. The thermal barrier overlayer contains a $Y_2O_3$ or MgO stabilized zirconia composition (preferably $ZrO_2$-12-w/o$Y_2O_3$ or $ZrO_2$-3.4w/oMgO), and it can be applied by plasma or flame spraying. The bond coating thickness is preferably from 0.003 inches to 0.007 inches and the zirconia-yttria and zirconia-magnesia barrier coatings are preferably from 0.010 inches to 0.030 inches thick. It will be understood that the thickness of the coating layers may be varied to achieve a desired temperature drop across the coating system barrier.

Each of the constituents of the coating system of the present invention may be produced by conventional techniques and, further, the temperatures used are those which are suitable for the particular method of application selected.

The following examples illustrate the advantages of the coating system of the present invention:

EXAMPLE I

A metal substrate was coated with a Ni—20w/o Cr bond coating and a $ZrO_2$—CaO (partially stabilized)

barrier coating. A second metal substrate was coated with a NiCrAlY bond coating and a $ZrO_2$—5.4w/o CaO (partially stabilized) thermal barrier layer. The thermal barrier layer was found five times more adherent to NiCrAlY than to Ni—20w/oCr.

EXAMPLE II

Metal substrates were prepared having a NiCrAlY bond coat. A first coated substrate was covered with an over-layer of $ZrO_2$—12w/o$Y_2O_3$, (totally stabilized) a second was coated with $ZrO_2$—3.4w/o MgO, (totally stabilized) a third was coated with $ZrO_2$—5.4w/oCaO (partially stabilized) as thermal barriers, a fourth was coated with $ZrO_2$—5.4w/o CaO (totally stabilized).

Three sets of metal work pieces were prepared as above. The first set was placed in a furnace for one hour exposure cycles at 975° C. The number of cycles that each work piece was capable of surviving without failure is set forth in Table A.

TABLE A

| | | |
|---|---|---|
| $ZrO_2$-$Y_2O_3$ | 673 cycles | no failure |
| $ZrO_2$-MgO | 460 cycles | failed |
| $ZrO_2$-CaO (partially stabilized) | 255 cycles | failed |
| $ZrO_2$-CaO (totally stabilized) | 87 cycles | failed. |

Sheet specimens were mounted in a gas oxygen torch rig. They were subjected to 25 minute cycles at 1,160° C. The number of cycles for each specimen that survived is set forth in Table B.

TABLE B

| | | |
|---|---|---|
| $ZrO_2$-$Y_2O_3$ | 254 cycles | cracked |
| $ZrO_2$-MgO | 56 cycles | cracked |
| $ZrO_2$-CaO (partially stabilized) | 35 cycles | cracked |

Work pieces formed as air cooled blades were inserted into a Mach 0.3 combustion rig. The cycle consisted of 40 second heat-up; 80 seconds at the temperature; and 30 seconds cooling. The number of cycles and the surface temperatures required before erosion or cracking induced the termination of testing are set forth in Table C.

TABLE C

| | | |
|---|---|---|
| $ZrO_2$-$Y_2O_3$ | 3200 cycles at 1280° C | erosion |
| $ZrO_2$-MgO | 1010 cycles at 1180° C | erosion |
| $ZrO_2$-CaO (partially stabilized) | 200 cycles at 1280° C | cracked |

The foregoing examples demonstrate the superior bonding capability of the NiCrAlY bond coat. These examples further demonstrate the effectiveness of $ZrO_2$—$Y_2O_3$ or $ZrO_2$—MgO as thermal barriers which resist thermal cracking. Further, the coatings are shown to increase the life of components subjected to high temperature use and thus will increase the life of those components in a turbine which are exposed to hot gases.

Although the invention has been described relative to preferred embodiments thereof, it will be understood by those skilled in the art that variations and modifications can be effected in this preferred embodiment without departing from the scope and spirit of the invention.

We claim:

1. A coated article of manufacture having a thermal barrier coating system comprising
    a substrate selected from the group consisting of nickel-base alloys and cobalt-base alloys,
    a bond coating consisting essentially of NiCrAlY covering said substrate, and
    a thermal barrier coating consisting essentially of zirconia stabilized with another oxide.

2. The thermal barrier coating system of claim 1 wherein said reflective oxide is selected from the group consisting of $ZrO_2$—$Y_2O_3$ and $ZrO_2$—MgO.

3. The thermal barrier coating system of claim 1 wherein the thickness of said bond coating is from 0.003 inches to 0.007 inches.

4. The thermal barrier coating system of claim 1 wherein the thickness of said thermal barrier coating is 0.010 inches to 0.030 inches.

5. A method of coating surfaces of nickel-base and cobalt-base alloys comprising:
    a. coating said surfaces with a bond coating consisting essentially of NiCrAlY; and
    coating the coated surfaces formed in step (a) with a thermal barrier coating consisting essentially of an oxide stabilized zirconia.

6. The method of coating a metal surface as claimed in claim 5 wherein said reflective oxide is selected from the group consisting of $ZrO_2$—$Y_2O_3$ and $ZrO_2$—MgO.

7. The method of coating a metal surface as claimed in claim 5 wherein the thickness of the bond coating is from 0.003 inches to 0.007 inches.

8. The method of coating a metal surface as claimed in claim 5 wherein the thickness of the thermal barrier coating is 0.010 inches to 0.030 inches.

* * * * *